LACHICOTTE & BOWMAN.
Rice Cleaner.
No. 17,882.
Patented July 28, 1857.
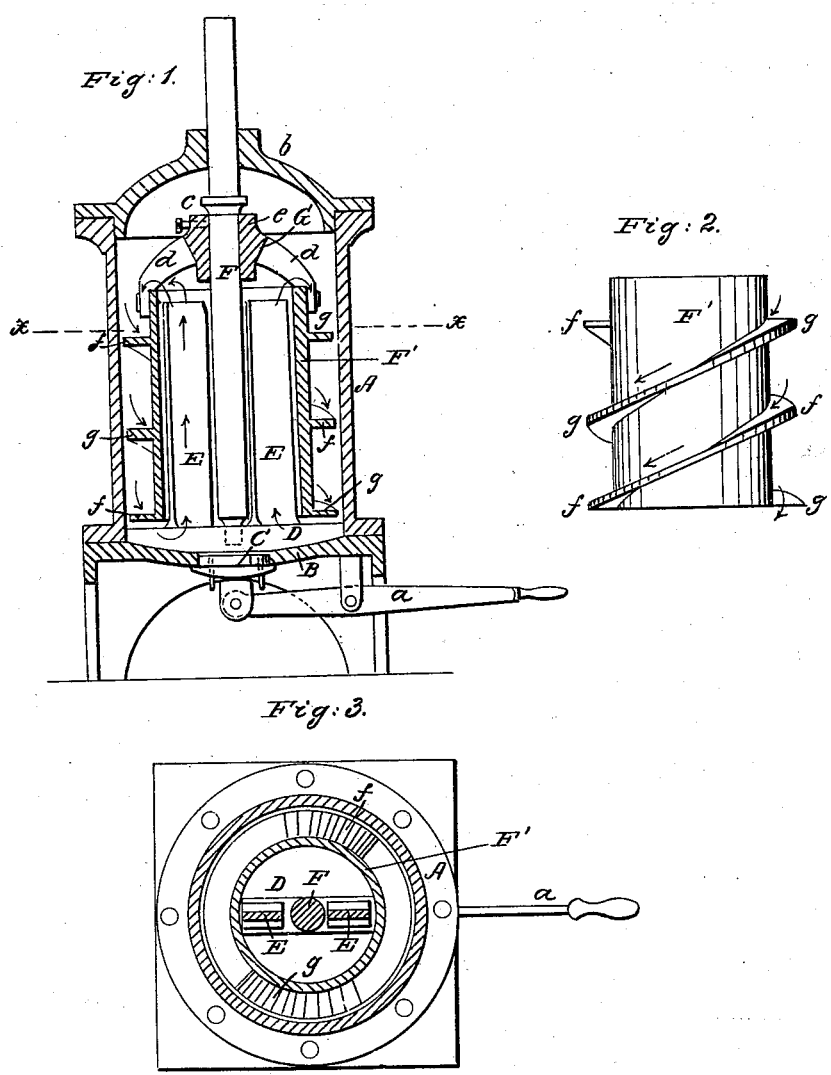

UNITED STATES PATENT OFFICE.

PHILIP R. LACHICOTTE AND T. B. BOWMAN, OF CHARLESTON, SOUTH CAROLINA.

IMPROVEMENT IN MACHINES FOR CLEANING RICE.

Specification forming part of Letters Patent No. 17,882, dated July 28, 1857.

*To all whom it may concern:*

Be it known that we, PHILIP R. LACHICOTTE and T. B. BOWMAN, of Charleston, in the district of Charleston and State of South Carolina, have invented a new and Improved Machine for Cleaning Rice; and we hereby declare that the following is a full, clear, and exact description of the same, reference being had to the annexed drawings, making a part of this specification, in which—

Figure 1 is a vertical central section of our improvement. Fig. 2 is a detached elevation of the inner screw-cylinder. Fig. 3 is a horizontal section of our improvement taken in the line $x\ x$. (See Fig. 1.)

Similar letters of reference indicate corresponding parts in the several figures.

This invention relates to a new and improved machine for detaching the flour or "scurf" from the rice after being hulled.

The invention consists in the employment or use of a hollow cylinder having screw-flanges attached to its outer side and placed within a cylindrical case, in which a bar and upright wings are secured, the parts being arranged and combined, as will be hereinafter fully shown and described, whereby the desired end is obtained in a simple expeditious manner.

To enable those skilled in the art to fully understand and construct our invention, we will proceed to describe it.

A represents a cylinder, the lower end of which is secured upon a bed B, having a concave upper surface, as shown plainly in Fig. 1. At the center of the bed B a valve C is placed. This valve is simply a circular plate attached to a lever $a$, which is pivoted below the bed.

To the upper surface of the bed B a bar D is secured transversely, said bar having two vertical flat parts or wings E E attached to it, a space being allowed between the two wings sufficiently wide to enable a shaft F to be placed between them. The lower end of the shaft F is stepped at the center of the bar D. The upper end of the shaft passes through the center of a cap $b$, which is secured to the top of the cylinder A.

F' represents a cylinder which is placed within the cylinder A, and is secured to the shaft F by means of a yoke G, which is secured to the shaft by a set-screw $c$. The yoke is formed of arms $d$, attached to a sleeve or hub $e$, through which the shaft F passes, the upper end of the cylinder being attached to the outer ends of the arms. To the outer surface of the internal cylinder F' there are attached two screws or spiral flanges $f\ g$. These flanges each make one turn or revolution on the cylinder F' and are nearly or quite equal in width to the space between the two cylinders. (See Fig. 1.) The pitch of the flanges may be greater or less, according to the height of the cylinder or as circumstances may require.

The upright bars or wings E E are within the cylinder F'.

The operation of the machine is as follows: The rice is placed into the upper part of the cylinder A, and the inner cylinder F' is rotated in any proper manner, said cylinder making about forty-five revolutions per minute, and the rice is pressed down by the action of the flanges, and underneath the lower edge of the cylinder F' and upward through the center of said cylinder and over its upper edge, to be again forced down by the flanges, (see arrows in Fig. 1,) the process being continued until the flour or "scurf" is completely detached from the grain by the friction produced by one kernel or grain rubbing against the other. The wings E E and bar D serve to prevent the mass of rice as it passes upward within the cylinder F' from turning with the cylinder, thereby increasing the friction of the grains or kernels one against the other, while the rotation of the cylinder prevents the rice from clogging therein and causes it to pass freely upward to the top and fall over on the screw-flanges. The cylinder F' may be raised and lowered on the shaft F, so that the friction produced by the grains rubbing against each other may be increased or diminished by enlarging or contracting the space between the lower ends of the screw-flanges and the bed B. The cleaned grain is allowed to pass from the machine by opening valve C.

This machine has been practically tested and operates rapidly. It cleanses the rice in about one-eighth the time required by the usual mortar and pestle.

We are aware that a rotating screw has been previously used for cleaning rice both alone and also in connection with a cylinder attached to the shaft of the screw and spiral projections at the bottom of the chamber or vessel. The latter device was patented by John F. Taylor, June 23, 1857. The object of Taylor's invention, however, was solely to direct the vertical current of the rice within the chamber or vessel. Our invention, it will be seen, while it possesses all the advantages of Taylor's, possesses others in addition—for instance, the proper action of the screw will frequently be neutralized in consequence of the rice passing around or rotating with it in a mass. The vertical current is thereby destroyed, and when this occurs of course there is inattrition between the several kernels or grains composing the mass. In our improvement this difficulty is avoided by the uprights E E and the bar D, as previously explained; and, further, by having the cylinder F' adjustable, and thereby enlarging or contracting the space between the lower end of the screw-flanges and the bed, the rice may be subjected to a greater or less degree of friction, as desired.

The uprights E E and the bar D are important features of the invention.

We do not claim separately the employment or use of a screw for the purpose specified, as that has been previously used; neither do we claim a cylinder in connection with the screw irrespective of its arrangement and its connection with the parts specified; but,

Having thus described our invention, what we claim as new, and desire to secure by Letters Patent, is—

The rotating and adjustable cylinder F', provided with the screw or spiral flanges $f\ g$, and placed within the cylindrical case A, in combination with the stationary wings E E, attached to the bar D on the bed B, the wings being within the cylinder F, and the whole arranged substantially as and for the purpose set forth.

PHILIP R. LACHICOTTE.
T. B. BOWMAN.

Witnesses:
WILLIAM G. MOOD, Jr.,
SAML. G. COURTENEY.